United States Patent [19]
Witmer et al.

[11] 3,952,705
[45] Apr. 27, 1976

[54] ANIMAL OPERATED DEVICE FOR COORDINATED FEEDING OF LIQUID AND GRAIN SUPPLEMENT TO LIVESTOCK

[75] Inventors: Bill B. Witmer, Sioux Falls; Mylo A. Hellickson, Brooking; David B. Goos, Esteline, all of S. Dak.

[73] Assignee: Farmers Union Grain Terminal Association, St. Paul, Minn.

[22] Filed: Apr. 9, 1975

[21] Appl. No.: 566,229

[52] U.S. Cl. ............................. 119/51 R; 119/51.5; 119/54
[51] Int. Cl.² ......................................... A01K 5/00
[58] Field of Search ................... 119/51 R, 51.5, 54

[56] References Cited
UNITED STATES PATENTS

| | | | |
|---|---|---|---|
| 2,158,093 | 5/1939 | Teske | 119/51 R |
| 2,293,643 | 8/1942 | Evans | 119/51 R |
| 2,651,291 | 9/1953 | Duke | 119/54 |
| 3,459,159 | 8/1969 | Reed | 119/51 R |

*Primary Examiner*—Hugh R. Chamblee
*Attorney, Agent, or Firm*—I. Morley Drucker

[57] ABSTRACT

The apparatus of this invention more positively controls liquid feed and solid (grain) feed consumption by animals in a simple economical and efficient manner, while minimizing contamination and wastage problems. Basically, the invention comprises in combination (1) a lick wheel rotatably mounted in an enclosed liquid feed container, with a portion of the circumference of the liquid wheel being exposed to the animal to be fed, (2) a means for adjusting the amount of lick wheel surface exposed to the animal to be fed, to thereby control the amount of liquid feed consumed by the animal per tongue lick, (3) means for discharging solid feed to the animal in an amount proportional to the amount of rotation of the lick wheel to obtain thereby a fixed ratio of solid to liquid feed, to be fed to the animal, and (4) means for varying the solid feed discharge independently of the amount of rotation of the lick wheel so as to increase or decrease the fixed ratio of solid to liquid feed fed to the animal.

The invention thus provides a means whereby the cow's tongue provides the power source for its own feeding of both liquid and grain supplements, the amount of each type of supplement being controllable mainly by means of the adjustment of the lick wheel surface exposed to the animal.

12 Claims, 12 Drawing Figures

U.S. Patent   April 27, 1976   Sheet 1 of 3   3,952,705
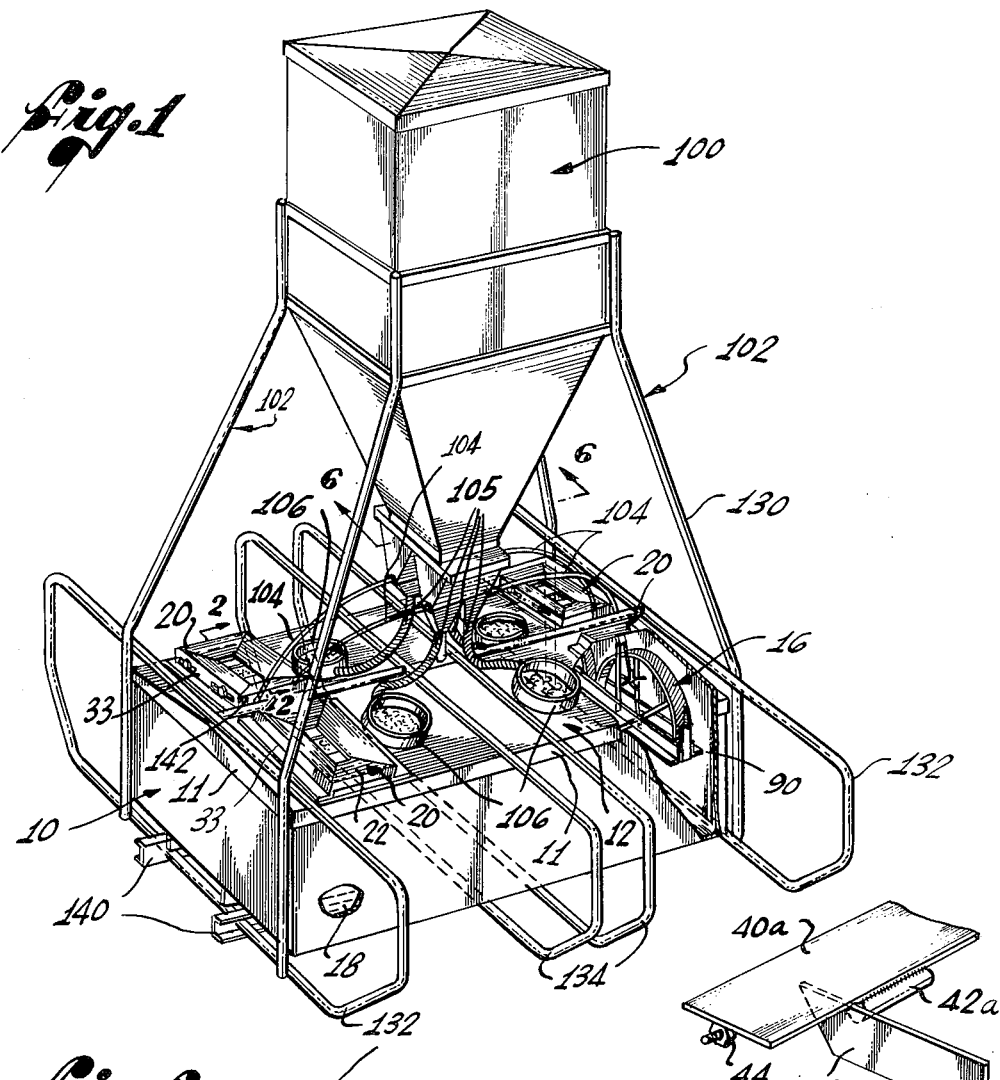
Fig.1
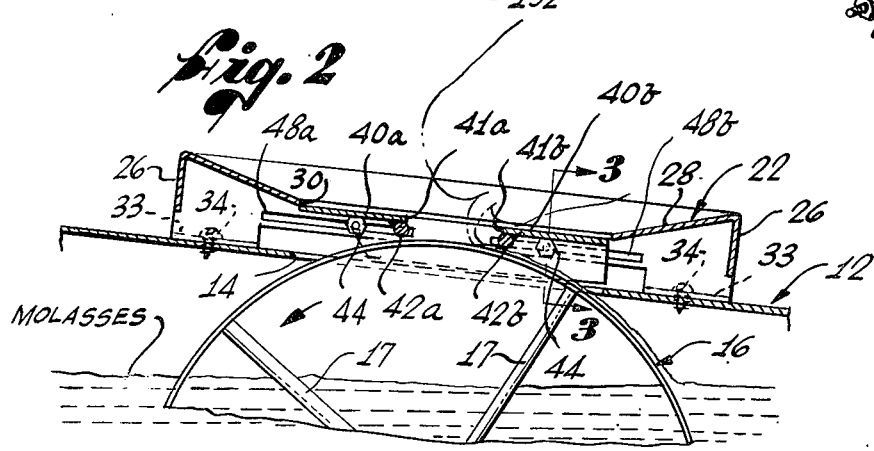
Fig.2
MOLASSES
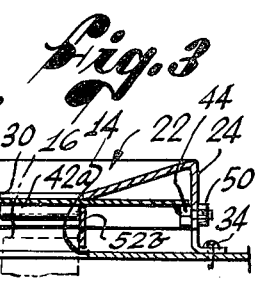
Fig.3a
Fig.3

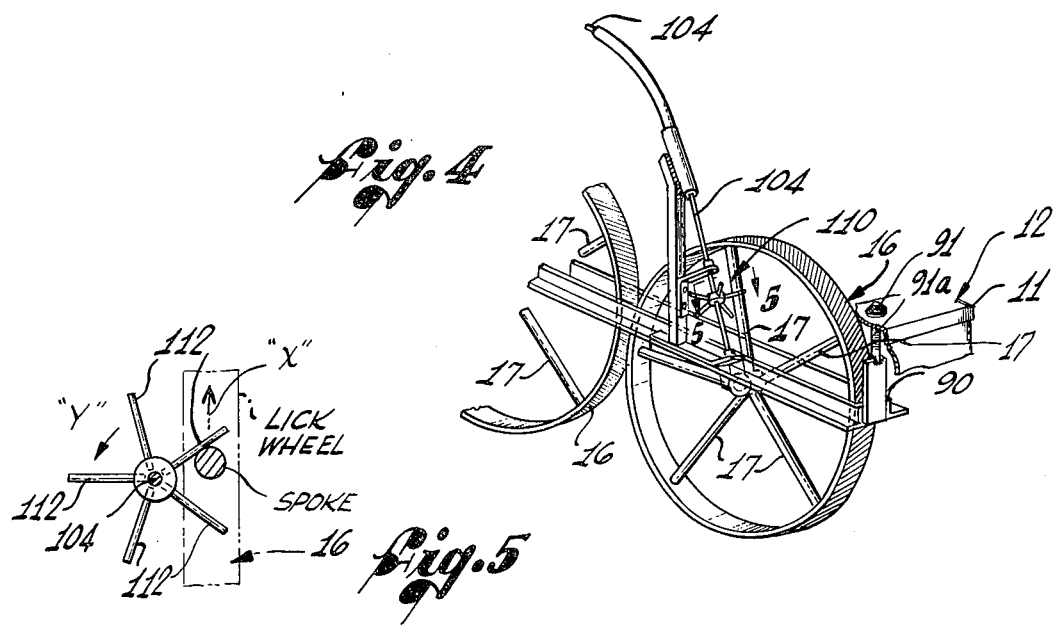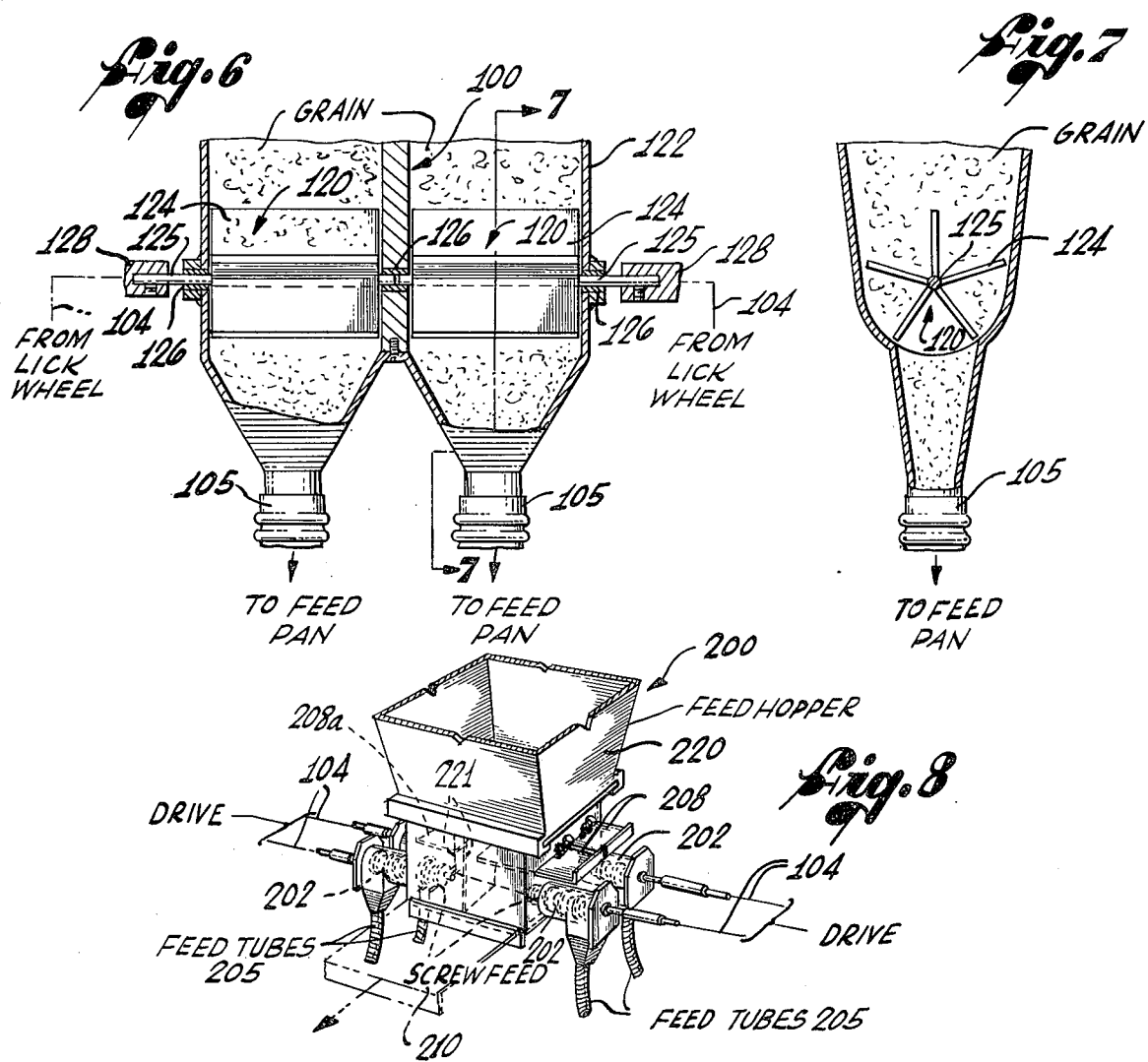

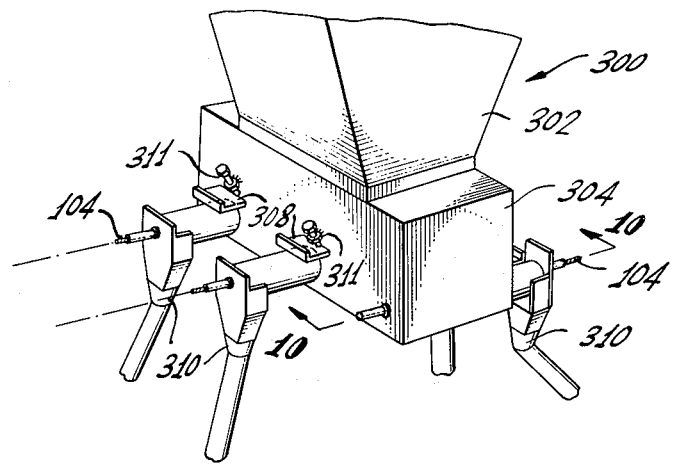
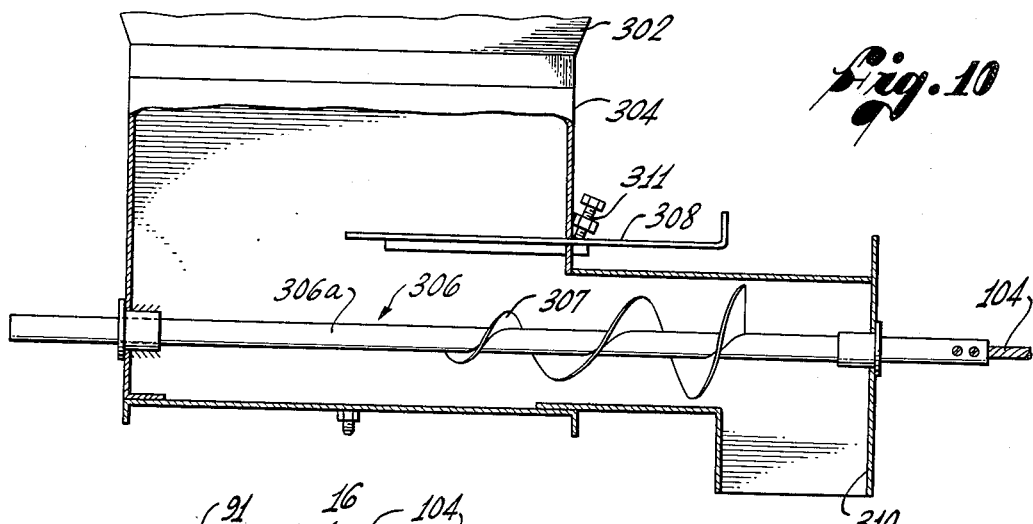
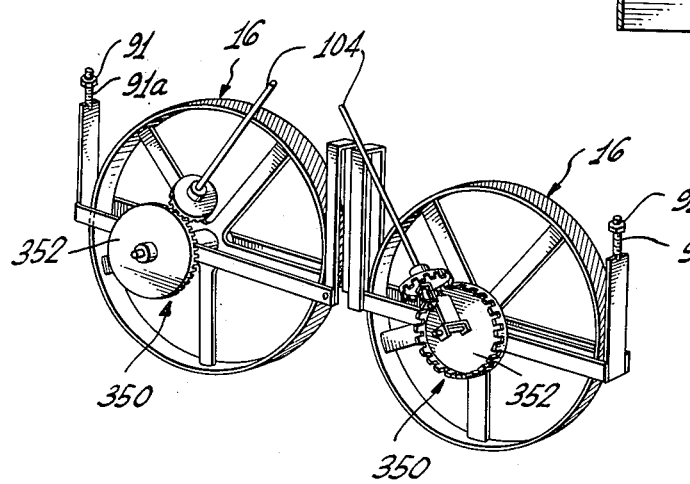

ANIMAL OPERATED DEVICE FOR COORDINATED FEEDING OF LIQUID AND GRAIN SUPPLEMENT TO LIVESTOCK

BACKGROUND OF THE INVENTION

This invention relates to a means for controlling both the liquid and grain supplement consumption of livestock, e.g., cattle and other animals.

In the past, open troughs containing liquid feed, have been extensively used for the feeding of domestic animals such as cattle. This method, however, enables the animal to eat at will and this can result in overfeeding of the animal. Further, the animal can allow a great deal of the liquid to be wasted by permitting it to drop on the ground adjacent the trough, thus resulting in the attraction of insects, flies, etc., and may result in contamination of the feed adjacent or on the trough. This, in turn, can lead to disease in the animals feeding from the trough.

In order to eliminate some of these problems, enclosed feeders have come into use, primarily for cattle, which feeders employ an enclosed liquid container with one or more rotatable discs or wheels dipping into the liquid feed. A portion of each of the wheels is exposed above the top of the enclosed container. As a cow licks a particular wheel, the liquid feed is picked up by the periphery of the wheel and is carried upwardly by the wheel to an exposed position above the container. See, for example, the patents to Reed, U.S. Pat. No. 3,459,159 and Teske, U.S. Pat. No. 2,158,093 and Teske, U.S. Pat. No. 2,158,094. The devices shown in those patents do not, however, really solve the problem of overfeeding of the animal because the animal can continue to lick the wheel and obtain, in reality, any amount he desires.

The apparatus of this invention not only more positively controls the liquid supplement consumption in a simple economical and efficient manner (while minimizing contamination and wastage problems) but utilizes the controlled amount of the liquid feed supplement as a basic means of controlling the grain supplement fed to the animals.

Coordinated feeding of both liquid and grain supplement utilizing the cow itself, as the power source, is a major object and achievement of the present invention.

SUMMARY OF THE INVENTION

The coordinated liquid and grain feeding system of this invention consists of the following main components:

1. a lick wheel rotatably mounted in an enclosed liquid feed container, with a portion of the circumference of the lick wheel being exposed to the animal to be fed;
2. a means for adjusting the amount of lick wheel surface exposed to the animal to be fed;
3. a means for discharging grain to the animal to be fed in an amount proportional to the amount of rotation of the lick wheel and thereby effect a predetermined ratio of solid to liquid feed; and
4. adjustment means to vary the said predetermined solid to liquid feed ratio either upwardly or downwardly.

The invention utilizes the tongue of the cow as the power source for turning of the lick wheel. It has been found that there is a direct correlation between the amount of lick wheel surface exposed and the amount of liquid feed consumed. In general, the less lick wheel surface exposed, the harder the animal must work to obtain the feed and the less feed is actually taken by the animal. It has been found, in field tests, that recommended liquid feeding levels of as low as one-third pound per head of cattle per day can be attained by suitable adjustment of the amount of exposed lick wheel surface. Thus, it is believed possible, based on experience, to prepare a graphical correlation or analysis showing the statistical relationship between lick wheel exposure and liquid feed intake by cattle.

The amount of rotation of the lick wheel is the basic determinant of the amount of grain fed to the animal. This means for effecting grain supplement discharge to the animal is readily obtainable. The presently preferred embodiment employs a driving means including a flexible shaft, one end of the driving means being coupled to the lick wheel, so as to rotate therewith. The other end of the flexible shaft is connected to a solid feed conveyor means located below a grain bin or hopper. The solid feed conveyor means rotates in proportion to the lick wheel rotation, and cause ejection of grain from the grain hopper and into a feed trough or feed pan in a predetermined ratio of solid to liquid feed.

The predetermined amount of grain provided per revolution of the lick wheel is varied by providing additional means for varying the amount of grain discharged per turn of the grain feeding means, independent of lick wheel rotation. Because of the variation in temperature from winter to summer of between about $-20°$ F. to about $90°$ F, it is important to have such a means of varying the grain to liquid ratio, independently of the rotation of the lick wheel.

A pipe framework is provided to support the grain hopper or bins and forms stalls to insure that the animal turning the lick wheel and eating the liquid supplement is allowed to eat the corresponding quantity of grain supplied to the feed trough.

BRIEF DESCRIPTION OF THE DRAWINGS

FIG. 1 is a perspective view of the combined liquid and grain feeder of our invention, for cattle and the like;

FIG. 2 is a cross-sectional view taken along the line 2—2 of FIG. 1;

FIG. 3 is a cross-sectional view, taken along the line 3—3 of FIG. 2;

FIG. 3a is a schematic view, in perspective, showing the relative placement of certain parts of the liquid controller shown in FIGS. 2 and 3;

FIG. 4 is a fragmentary, perspective view of several of the lick wheels, which have been isolated from the liquid feeder shown in FIGS. 1–3a;

FIG. 5 is a cross-sectional view, taken along the line 5—5 of FIG. 4;

FIG. 6 is a partial, side elevational, cross-sectional view of the grain bin, taken along the line 6—6 of FIG. 1;

FIG. 7 is an end elevational cross-sectional view, taken along the line 7—7 of FIG. 6;

FIG. 8 is a partial view in perspective of an alternative form of grain feeding mechanism;

FIG. 9 is a fragmentary, perspective, view of still another embodiment of grain bin and feed conveyor means associated therewith;

FIG. 10 is a partial cross-sectional view, taken along the line 10—10 of FIG. 9; and FIG. 11 is a partial, perspective view of still another embodiment of lick wheel and driving means for the grain feeder.

DETAILED DESCRIPTION OF THE PREFERRED EMBODIMENTS a. General Arrangement of Parts

The liquid grain supplement feeder of our invention has two interrelated main components:

I. A consumption control device for the liquid feed supplement operatively associated with the tank or container carrying the liquid feed, the power source for which is the animal to be fed; and II. A consumption control device for the grain supplement, which device discharges grain to the animal to be fed in proportion to the amount of liquid supplement consumed by the animal, and includes a means to vary the said proportion independently of the liquid supplement consumed.

The liquid consumption control devices are indicated, generally, by the numeral 20 and are stably positioned on a liquid feed container 10, as best shown in FIG. 1. The grain bid 100, and its consumption control means are preferably mounted above the container 10 and supported by a metal framework 102. The liquid consumption control unit 20 includes a preferably spoked metal lick wheel 16, which wheel is turned by the animal to be fed in order to obtain the liquid (e.g., molasses or rum-lick) which it likes. As the wheel 16 is turned, a drive means, in the form of a drive sprocket 120 and a flexible shaft 104 is turned, driving a grain conveyor mechanism located within the grain bin 100. The grain conveyor mechanism discharges the grain supplement into a feed pan 106, the amount of grain discharge bearing a proportional relationship to the amount of liquid consumed by the animal. The amount of grain reaching the grain conveyor mechanism is also made variable independently of the rate of rotation of the drive shaft 104, as will be seen, in order to permit large variations in ratio of grain to liquid.

The consumption control units 20 are designed so that the animal may obtain a predetermined amount of liquid varying within wide ranges of liquid per day, e.g., from one-third of a pound per day up to 6 pounds per day, or more. The grain discharged will bear a fixed ratio, varying from about 2:1 to 30:1 or even greater of grain weight to liquid weight. One important requirement of this invention is that the amount of liquid fed to the animal be kept under close control.

If the liquid feed is not closely controlled, the animal will tend to overeat on the grain resulting in sometimes serious sickness to the animal.

b. The Liquid Consumption Control Device 20

Referring particularly to FIGS. 1–4, the liquid feed container 10 comprises a preferably rectangular, liquid-tight, inert metal or inert plastic compartment. The container 10 has a top or closure 12 provided with downwardly extending edges 11, the closure 12 enclosing the container 10. The closure 12 has a plurality of openings or slots 14 provided therein through which projects a plurality of rotatably mounted, spoked lick wheels 16, the spokes being designated by the numeral 17. While a plurality of closure slots 14 and corresponding lick wheels 16 are shown in association with container 10, it will be understood that a single lick wheel 16 and closure slot 14 may be utilized in this invention. The means for rotatably mounting the lick wheels 16 are conventional and well within the skill of the art. A liquid 18, such as molasses, is shown in the container 10 (FIG. 1).

The consumption control devices 20 of this invention are designed to be stably positioned on the container top 12 and to overlie each of said lick wheels 16 in order to provide an adjustable opening over that portion of the lick wheel extending through the top 12. The means by which this is accomplished will be set forth.

Each of the consumption control devices 20 has a preferably rectangular housing member 22 having an inverted U-shaped cross-section (see FIGS. 2 and 3), the housing member 22 comprising a pair of opposed, parallel, generally vertically extending sidewalls 24, a pair of opposed, parallel, vertically extending endwalls or end panels 26, and a dished top cover 28. The housing member 22 is preferably made of a non-corrosive metal or metal alloy, the walls 26, 24 and cover 28 of which are welded together or otherwise integrally united. The dished top cover 28 has a rectangular slot 30 formed therein and means are provided, as will be described, for varying the extent to which the control slot 30 may be closed off.

The housing member 22 is aligned with container top 12 so that the control slot 30 of the housing member directly overlies that portion of the lick wheel 16 projecting through the closure 14, i.e., the longitudinal center line or axis of the control slot 30 and the longitudinal axis passing through the lick wheel pass through substantially the same vertical plane. The sidewalls 24 of housing 22 have flanges 33 extending horizontally therefrom. Locking bolts or screws 34 pass through appropriate apertures in flanges 33 and stably position the housing member 22 in the just-described overlying position, the bolts or screws 34 being secured to the container top 12.

The presently preferred means for varying the openness of control slot 30 comprises, basically, a pair of adjustable, slidably movable metal blocking members, baffles or slide plates 40a, 40b, which slide members extend across the slot 30 and on the underside of cover 28 of housing member 22. The members 40a, 40b can be slidably and independently moved to vary the extent to which control slot 30 is to remain open. This is accomplished as described below.

To the inner opposed edges 41a, 41b of each of the slide plates 40a, 40b are affixed, e.g., as by welding round metal bars 42a, 42b, respectively; and at the sides of each plate 40a, 40b, there is affixed, e.g., as by welding, headed threaded bolts 44. The threaded portions of the bolts 44 extend through two pairs of elongated adjusting slots 48a, 48b provided in the sidewalls 24 of housing member 22 and appropriately sized washers and nuts 50 are releasably mounted on each of said threaded bolts 44. Tightening of the nuts 50 fixes the position of the slide plates 40a, 40b and loosening of the nuts 50 enables the plates 40a, 40b to be moved across slot 30.

The function of the round metal bars 42a, 42b are three-fold. First, they blunt the edges of the slide plates 40a, 40b, to which they are affixed and thereby prevents the cow's tongue from being exposed to sharp edges. Secondly, the round bars act as wiping bars, to wipe off excess liquid feed accumulating on the lick wheel 16, as it passes through the liquid feed (which may be very viscous). Thirdly, the round bars 42a, 42b act as guide members for the slide plates 40a, 40b, as will be described.

The slide plates 40a, 40b are guided in their movement across control slot 30 by means of a channel formed on the underside of the slide plates. The channel is formed by a pair of parallel, spaced, elongated vertically extending guide plates or channel members 52a, 52b. Each guide plate 52a, 52b is preferably affixed to both ends of one round bar 42a only, e.g., as by welding (and as best seen in FIG. 3) so that as slide plate 40a is slidably moved, both channel members (52a and 52b) move with it. The other round bar 42b and associated slide plate 40b are not affixed to the channel members 52a, 52b so slide plate 40b remains stationary as slide plate 40a is moved.

Thus, in operation, as the bolts 50 associated with sliding plate 40a are loosened, sliding plate 40a may then be moved to the right or left, as viewed in FIG. 2, to thereby close or open the gap, respectively, between plates 40a and 40b. As sliding plate 40a is moved, channel members 52a and 52b move with plate 40a and the other round bar 42b remains stationary and acts to direct movement of the channel members 52a and 52b along a line parallel to the axis of the control slot 30. Conversely, when sliding plate 40b is to be moved, the associated bolts 50 are first loosened. Then, as sliding plate 40b is moved, the channel members 52a, 52b, being unattached to slide plate 40b, remain stationary and constrain and direct movement of slide plate 40b along a line parallel to the axis of the slot 30.

The slide plates or members 40a, 40b thus can be independently, slidably and adjustably positioned, within control slot 30 to thereby vary the opening of the slot 30, and thereby vary the amount of surface of the lick wheel which the cow can reach.

The channel members 52a, 52b have another function in addition to that of directing movement of the slide plates 40a, 40b along a given path. The cow has very great strength in its tongue, and has sufficient intelligence, as well, to attempt to move its tongue alongside the lick wheel 16 in order to obtain more liquid feed. However, because the channel members 52a, 52b are fixedly mounted to the ends of the round bar 42a, and because the round bar 42a is mounted directly above the lick wheel 16, the channel members 52a, 52b are juxtaposed immediately adjacent the sides of the exposed portion of the lick wheel 16 (see FIG. 3, especially), and the cow cannot thrust his tongue along the sides of the wheel 16 and into the liquid feed tank 10. The channel members 52a, 52b thus act as shield members, preventing entry of the cow's tongue into the liquid feed tank 10.

Other means for effecting movement of the slide members 40a, 40b across control slot 30 will appear to those skilled in the art and other modifications too, will appear to those skilled in the art. For example, while a pair of slide members 40a, 40b have been shown and described, it is possible to vary the lick wheel exposure by means of a single, slidably adjustable, plate movable across slot 30.

c. The Grain Feeder Device

In general, the grain feeder devices of this invention includes a drive means, powered by the lick wheel 16, a grain bin and a grain conveyor means in or below the grain bin operatively connected to the drive means, so that as the lick wheel 16 is turned the grain conveyor means feeds an amount of grain into a feed trough or pan, that is proportional, by weight, to the weight amount of liquid consumed by the animal. The grain conveyor device of this invention has, as a vital part thereof, adjustment means to vary the grain discharged to the feed trough which is independent of the rotation of the lick wheel. This adjustment means therefor permits variability of the grain to liquid ratio from that determined solely by the rotation of the lick wheel, when desired.

The grain feeder means may have a variety of specific embodiments. In the embodiment shown in FIGS. 4–7, the lick wheels 16 in liquid feed container 10 are rotatably mounted within side brackets 90, the brackets in turn being mounted, for vertical adjustment, to the cover 12 of the container 10 (see FIGS. 1 and 4, especially) by means of nut and bolt combination 91, 91a. Other means of rotatably mounting the lick wheels 16 may be readily employed. The lick wheels 16 are rotatably mounted, and vertically adjustable, so that the wheels 16 may be moved into precise alignment with the consumption control devices 20.

As a lick wheel 16 is rotated, by the animal itself, the spokes 17 of the wheel 16 sequentially engage the teeth 112 of a sprocket wheel 110 to turn in a counter-clockwise direction as indicated by the arcuate a-row "Y". Affixed within the central portion of the sprocket wheel 110 is one end of a flexible drive shaft 104, previously referred to, which drive shaft 104 is operatively connected to a grain conveyor means 120 located near the bottom of the grain hopper or grain bin 122.

The grain conveyor means 120 comprises a plurality of paddle wheels 124, the shaft 125 of each wheel being rotatably mounted, within suitable bushings 126, mounted within the grain bin 122. Each paddle wheel 124 is independently rotatable in response to the rotation of its associated drive shaft 104. To this end, the shaft 125 of each paddle wheel 124 is suitably coupled to each drive shaft 104 by coupler means 128.

As each paddle wheel 124 is rotated, in response to the rotation of its drive shaft 104, each wheel discharges grain from the grain bin 122, to its associated feed pan 106 via a flexible tube 105, in an amount that is proportional to the speed of rotation of its drive shaft. Thus, the weight amount of grain discharged lies in direct proportion to the amount of rotation of the lick wheel 16. And the amount of rotation of lick wheels 16 is proportional to the number of licks of liquid supplement taken by the animal.

The amount of rotation of each paddle wheel with respect to its associated lick wheel 16 can be varied greatly, simply by varying the spacing of the teeth 112 on the sprocket wheel 110, and/or varying the spacing of spokes 17 of lick wheel 16.

Further, the amount of solid feed flowing to the paddle wheel 124 can be controlled by varying the opening of the area in the bin 122 above the paddle wheel (not shown). In this way, the grain to liquid feed ratio can be varied independently of the rotation of the lick wheel 16, and thereby provides a wide range of ratios of grain to liquid feed.

Another form of grain feeder device (200) is shown in FIG. 8, wherein grain in the feed hopper 220 falls, by gravity, onto a lower grain support plate 210. Only a single grain support plate 210 need be provided for a plurality of screw feeders 202. As a screw feeder 202 rotates, it will convey grain lying on the support plate 210, to its associated feed tube 205.

The amount of solid feed delivered, per revolution of screw feeder 202 is determined by the length of exposure of the leading end of the screw to the granular feed, and is controlled by slides 208, 208a mounted above and parallel to the screw feeders 202. Moving the slides 208, 208a horizontally produces a corresponding change in the angle of repose of the granular material relative to the screw feeders 202. In this manner, more or less grain can be fed to screw conveyors 202 by simply adjusting the slides 208, 208a.

The lower end of the feed hopper 220 is compartmented, by partition 221, so that the movement of slides 208, 208a, will change the angle of repose with respect to each of the two screw conveyors 202.

The grain support plate 210 is slidably mounted in grain feeder 200, so that in the dotted position shown in FIG. 8, the lower cavity of the feed hopper 220 can be readily cleaned.

The grain feeder 200 thus operates on the same principles as does grain feeder 100. The grain feeder 200, however, is presently preferred because it provides greater precision of the solid feed flow to and from the feed conveyor means 202.

Another form of grain feeder device is shown in FIGS. 9 and 10, and is designated by the numeral 300. The feed hopper 302 has a lower housing 304 communicating with the feed hopper, the housing 304 containing a plurality of compartments. Each compartment contains a screw conveyor means 306, an upper slidable plate, or slide means 308, and a feed outlet means 310.

Each screw conveyor means 306 comprises a central shaft 306a, and a helical screw blade 307, the central shaft 306a being affixed to flexible drive shaft 104, as previously described with reference to FIG. 6. In this manner, the screw conveyors 306 will rotate in proportion to the rotation of flexible drive shafts 104. However, large variation of the amount of solid feed fed to the screw conveyor 306 is achieved, by moving the slide 308 horizontally. Moving the slide 308 horizontally enables a corresponding change in position of the angle of repose of the solid, granular, material fed to housing 304 from hopper 302, and thus varies the amount of grain gathered by the screw blade 307 per revolution. In this manner, the proportion of grain flow, to liquid taken by the animal, is made variable over a wide range of ratios, and can be varied independently of the rotation of a lick wheel 16.

The leading portions of screw blade 307 are tapered for about 1½ flights of the screw blade from full dimension to the diameter of the screw conveyor shaft 306a (see FIG. 9) in order to achieve an improved proportioning of granular feed. The tapering of the screw blade 307 allows the slide 308 to be moved over a greater distance, for a given change in granular material being gathered up by the screw conveyor 306, as compared to a screw conveyor having a uniform-diametered screw blade.

It will be noted that slide 308 can be fixed in a predetermined position, by adjustment screw 311, screw 311 tightly abutting the top of slide 308 when no movement thereof is desired, and it is further noted that the screw blade 307 has a positive pitch in order to insure grain delivery.

The grain feeder 100, shown in FIG. 1, is supported by pipe framework 102. The framework 102, in turn, comprises angular, generally upstanding, pipe supports 130, the upper ends of which enclose grain bin 122 and the lower ends of which are welded or otherwise affixed to a pair of side rails 132 running alongside the end walls of the container 10. A second pair of inner rails 134 are spaced between side rails 132 so as to form a pair of stalls on each side of container 10.

The rails 132, 134 are stably mounted with respect to each other, by being affixed to bottom laterally extending struts 140, and by being affixed to laterally extending top pipe member 142.

One liquid feed control unit 20 and one grain feed pan 106 are located in each stall formed by rails 132, 134 so that four animals can feed from the apparatus of this invention, at the same time. The placement of the liquid feed unit 20 next to the grain feed trough or pan 106 in the same stall insures that an animal receives only the grain that it has strived for by rotating the lickwheel 16. The same pipe framework may be utilized with the grain feeder mechanisms shown in FIGS. 8–10.

As an alternative to the sprocket wheel 110 drive means, shown in FIGS. 4 and 5, a more positive drive means 350 may be employed as shown in FIG. 11. The lick wheels 16 are mounted, as hereinbefore described, within the liquid feed container 10, the lick wheels 16 being vertically adjustable by means of nut and bolt combinations 91, 91a. Each of the drive means 350 comprises a main or primary toothed gear 352 fixedly mounted to each lick wheel 16, so as to rotate therewith. The rotation of a lick wheel 16 is transmitted to a flexible shaft 104 mounted to a secondary gear 354. Secondary gear 354 meshes with the main or primary gear 352, and, in this manner, flexible shaft 104 rotates in proportion to the rotation of a lick wheel 16.

The drive means 350 is more positive than that of the sprocket wheel form 110, and is presently preferred — although the sprocket wheel form 110 is less expensive to manufacture.

This invention utilizes the animal's predilection for the liquid supplement (e.g., molasses) as a basic means of controlling the grain supplement which the animal ultimately consumes. Thus, it is now known that a cow will, on the average, lick the lick wheel for about 80–100 licks before it tires. The average number of revolutions of the lickwheel per animal per day is on the order of 20–40 revolutions. If the lick wheel adjustment is set so that about 0.02 lbs liquid per revolution is obtained, then the animal will obtain about 0.4–0.6 lbs. of liquid daily, and if the weight ratio of grain to liquid is adjusted to a 4:1 ratio, the animal will eat about 1.6–2.4 lbs. of grain supplement daily.

It is presently estimated that about 100 head of cattle per day, can be fed from the apparatus of this invention.

The feeds utilizable range from finely ground oats and grain sorgum mixture to a pelleted barley concentrate. The animals consumed a uniform liquid consumption rate per day indicating that the animal had developed regular eating habits and maintained quite uniform grain consumption, as well as liquid consumption, rates.

Inasmuch as the apparatus of this invention is intended for use on the range, as well as at the feed lot, under both summer and winter conditions, with a wide variety of granular feeds, and with both heifers as well as calves and grown cows, a wide range of grain to liquid ratios is required.

One means of achieving a wide range of grain to liquid ratios has been described herein and involves a solid feed conveyor means rotatable in proportion to the rotation of the lick wheel in combination with a means to vary the amount of solid feed fed the feed conveyor means independently of the rate of rotation of the lick wheel.

A variable gear means (not shown) interconnecting the lick wheel 16 to the feed conveyor means — for the purpose of further varying the amount of feed fed to the feed conveyor means in varying proportion to the actual rate of rotation of the lick wheel, may also be employed.

Modifications of the drive means, grain feeder means and the liquid feeder control unit may be made by those skilled in the art. It is therefore our intention to be bound only by the claims that follow.

We claim:

1. In a liquid and solid grain feeder having a liquid feed container, a closure for said liquid feed container and at least one lick wheel rotatably mounted therein with a portion of the circumference of said lick wheel extending through an opening in said closure, the improvement which comprises;
    means for providing an adjustable opening over the said portion of said lick wheel extending through said opening of said closure;
    means for adjusting said lick wheel, along a substantially vertical axis, to a predetermined spacing with respect to said means for providing said adjustable opening;
    a drive means fixedly mounted to said vertically adjustable lick wheel and including a drive shaft rotatable in proportion to the rotation of said drive means;
    a solid feed bin;
    feed conveyor means, communicating with said solid feed bin, and operatively connected to said drive shaft to rotate in proportion to the rotation of said drive shaft;
    means to vary the amount of solid feed fed to said conveyor means independently of the rate of rotation of said drive shaft;
    a feed trough; and
    feed outlet means leading from said conveyor means to said feed trough.

2. The liquid and solid grain feeder of claim 1 wherein said solid feed bin is mounted above said liquid feed container, and said solid feed flows through said feed outlet means by gravity flow.

3. The liquid and solid grain feeder of claim 1 wherein said feed conveyor means includes a screw conveyor means operatively connected to said drive shaft to rotate in proportion to the rotation of said drive shaft.

4. The liquid and solid grain feeder of claim 3 wherein said screw conveyor means has at least one of the leading flights of the screw thereof of lesser diameter with respect to the major diameter of the trailing flight of said screw conveyor.

5. The liquid and solid grain feeder of claim 3 wherein said feed conveyor means includes also a variable slide means mounted above said screw conveyor means, said variable slide means varying the amount of said feed delivered to said screw conveyor means.

6. The liquid and solid grain feeder of claim 1 wherein said lick wheel has a central axle and a plurality of spokes radiating therefrom, and said drive means includes a sprocket member, each finger of said sprocket member being successively engageable with each of said plurality of spokes of said lick wheel.

7. The liquid and solid grain feeder of claim 1 wherein said feed conveyor means includes a rotatable paddle wheel rotatable in response to the movement of said drive means.

8. The liquid and solid grain feeder of claim 1 wherein said drive shaft is flexible.

9. The liquid and grain feeder of claim 1 wherein said means for providing an adjustable opening in said closure comprises further:
    a housing member;
    a slot formed in said housing member, said slot adapted to overly the circumference of said portion of said lick wheel extending through said opening in said closure; and
    adjustable means for closing different areas of said slot to thereby vary the amount of surface of the circumference of said portion of said lick wheel exposed to the animal to be fed.

10. The liquid and grain feeder of claim 1 wherein said means for providing an adjustable opening in said closure comprises further:
    a housing member;
    a slot formed in said housing member, said slot adapted to overly the circumference of said portion of said lick wheel extending through said opening of said closure; and
    at least one slide member having a substantial surface area, mounted for movement to different positions in said slot, to thereby close off varying areas of said slot and thereby vary the amount of surface of the circumference of said portion of said lick wheel exposed to the animal to be fed.

11. The liquid and grain feeder of claim 1 wherein said means for providing an adjustable opening in said closure comprises further:
    a housing member adapted to be stably positioned overlying said portion of said lick wheel extending through said opening of said closure, said housing member having means for opening the interior thereof, at variable but predetermined areas, to thereby adjust the amount of surface of the circumference of said portion of said lick wheel exposed to the animal to be fed.

12. The liquid and grain feeder of claim 1 wherein said drive means includes a primary gear means fixedly mounted to said adjustable lick wheel so as to rotate therewith, and a secondary gear means engaging with said primary gear means and being connected to said drive shaft whereby said drive shaft is rotatable in proportion to the rotation of said primary and secondary gear means.

* * * * *